United States Patent
Shi et al.

(10) Patent No.: US 10,532,637 B2
(45) Date of Patent: Jan. 14, 2020

(54) ANTI-GLARING LIGHT SYSTEM AND VEHICLE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Bo Shi, Beijing (CN); Yuanming Feng, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/261,225

(22) Filed: Jan. 29, 2019

(65) Prior Publication Data

US 2019/0232763 A1    Aug. 1, 2019

(30) Foreign Application Priority Data

Jan. 30, 2018  (CN) .......................... 2018 1 0088245

(51) Int. Cl.
*B60Q 3/00* (2017.01)
*B60J 3/06* (2006.01)
(Continued)

(52) U.S. Cl.
CPC .................. *B60J 3/06* (2013.01); *B60Q 1/04* (2013.01); *F21S 41/135* (2018.01); (Continued)

(58) Field of Classification Search
CPC .................................. B60J 3/06; F21S 41/135
See application file for complete search history.

(56) References Cited

U.S. PATENT DOCUMENTS 2,031,045 A * 2/1936 Land ..................... F21S 41/135
                                                    359/487.06
2,755,700 A * 7/1956 Ljungstrom ............... B60J 3/04
                                                    359/229
(Continued)

FOREIGN PATENT DOCUMENTS

CN         2044035 U      9/1989
CN       101870247 A     10/2010
(Continued)

OTHER PUBLICATIONS

First Office Action for Chinese Application No. 201810088245.2, dated Sep. 2, 2019, 8 Pages.

*Primary Examiner* — Thuy V Tran
(74) *Attorney, Agent, or Firm* — Brooks Kushman P.C.

(57) ABSTRACT

An anti-glaring light system and a vehicle are provided in the present disclosure. The system includes a light emitting device, configured to selectively emit first polarized light having a first polarization direction along a first light-emergent path or ordinary light along a second light-emergent path; and an eye-protection device, configured to block second polarized light having a second polarization direction incident into the eye-protection device, enable the first polarized light to pass through the eye-protection device and be propagated to eyes of a user along a first light-incident path, and enable the ordinary light to be propagated to the eyes of the user along a second light-incident path.

20 Claims, 6 Drawing Sheets

(51) Int. Cl.
*F21S 41/135* (2018.01)
*F21S 41/20* (2018.01)
*G02C 7/12* (2006.01)
*G02F 1/137* (2006.01)
*B60Q 1/04* (2006.01)

(52) U.S. Cl.
CPC .............. *F21S 41/285* (2018.01); *G02C 7/12* (2013.01); *G02F 1/137* (2013.01); *B60Q 2300/42* (2013.01)

(56) References Cited

U.S. PATENT DOCUMENTS

| | | | |
|---|---|---|---|
| 3,935,444 A * | 1/1976 | Zechnall | G02B 27/285 362/19 |
| 2016/0091645 A1 | 3/2016 | Birman et al. | |
| 2017/0023802 A1 | 1/2017 | El Idrissi et al. | |
| 2017/0356612 A1* | 12/2017 | Leon Esquivel | F21S 41/135 |
| 2019/0204627 A1 | 7/2019 | Wang et al. | |

FOREIGN PATENT DOCUMENTS

| | | |
|---|---|---|
| CN | 105459825 A | 4/2016 |
| CN | 106371224 A | 2/2017 |
| CN | 107054202 A | 8/2017 |
| JP | 2017218103 A | 12/2017 |

\* cited by examiner

ANTI-GLARING LIGHT SYSTEM AND VEHICLE

CROSS-REFERENCE TO RELATED APPLICATION

This application claims priority to Chinese Patent Application No. 201810088245.2 filed on Jan. 30, 2018, which is incorporated herein by reference in its entirety.

TECHNICAL FIELD

The present disclosure relates to a field of lighting, and in particular, to an anti-glaring light system and a vehicle including the anti-glaring light system.

BACKGROUND

When one car meets another car or overtakes another car ahead, a driver usually needs to shut off a high-beam headlight or switch the high-beam headlight to a low-beam headlight, so as to avoid causing sight-line interference to the another car. However, if the high-beam headlight is turned off, a remote road surface and a remote object may not be illuminated, thereby causing hidden danger to the driver.

SUMMARY

An anti-glaring light system and a vehicle including the anti-glaring light system are provided in the present disclosure.

In a first aspect, an anti-glaring light system is provided in the present disclosure and includes: a light emitting device, configured to selectively emit first polarized light along a first light-emergent path or emit ordinary light along a second light-emergent path, wherein the first polarized light has a first polarization direction; and an eye-protection device, configured to block second polarized light having a second polarization direction incident into the eye-protection device, configured to enable the first polarized light having the first polarization direction to pass through the eye-protection device along a first light-incident path, and configured to enable the ordinary light to be propagated to the eyes of the user along a second light-incident path.

Optionally, the light emitting device includes a light source, a first light propagator, and a first polarizer; the light source is configured to emit the ordinary light; the first light propagator is configured to enable the ordinary light emitted by the light source to be propagated to the first polarizer and be emitted out along the first light-emergent path, or enable the ordinary light to be emitted out directly along the second light-emergent path; and the first polarizer is configured to convert the ordinary light to the first polarized light having the first polarization direction.

Optionally, the eye-protection device includes a second light propagator and a second polarizer; the second light propagator is configured to enable the first polarized light having the first polarization direction to be propagated to the second polarizer and be propagated to the eyes of the user along the first light-incident path, and enable the ordinary light to be propagated to the eyes of the user directly along the second light-incident path; a polarization direction of the second polarizer is same as the first polarization direction of the first polarized light.

Optionally, the light emitting device is in a first vehicle, the eye-protection device is in a second vehicle meeting the first vehicle, or the eye-protection device is a pair of eye-protection glasses worn by a driver of the second vehicle.

Optionally, the first vehicle and the second vehicle are different, and the first polarized light having the first polarization direction emitted from the light emitting device in the first vehicle is blocked by the eye-protection device in the second vehicle.

Optionally, the first vehicle and the second vehicle are same, and the first polarization direction is perpendicular to the second polarization direction.

Optionally, the anti-glaring light system further includes a first adjuster configured to adjust a direction of a light-transmissive axis of the first polarizer.

Optionally, the anti-glaring light system further includes a second adjuster configured to adjust a direction of a light-transmissive axis of the second polarizer.

Optionally, the first light propagator includes a first lens and a second lens, the first lens is adjacent to the light source, and the second lens is adjacent to the first polarizer; the first lens is a liquid crystal lens including liquid crystal molecules, and is configured to enable the liquid crystal molecules in the first lens to rotate under a condition that the first lens is applied with a first driving signal, so that the ordinary light is refracted to the second lens by the first lens and is propagated to the first polarizer through the second lens and is emitted out along the first light-emergent path; wherein under a condition that the liquid crystal molecules in the first lens are not rotated, the ordinary light emitted by the light source is emitted out directly along the second light-emergent path after the ordinary light passes through the first lens.

Optionally, the second light propagator includes a third lens, a first reflector, and a second reflector, the third lens is at a light-incident side of the second polarizer relative to the second polarizer, the first reflector is at a light-emergent side of the second polarizer relative to the second polarizer, and the second reflector is at a light-emergent side of the first reflector relative to the first reflector; the third lens is a liquid crystal lens including liquid crystal molecules, and is configured to enable the liquid crystal molecules in the third lens to rotate under a condition that the third lens is applied with a second driving signal, so that light incident into the eye-protection device is propagated to the second polarizer through the third lens, and polarized light passing through the second polarizer is propagated to the first reflector, reflected to the second reflector by the first reflector, reflected by the second reflector and propagated to the eyes of the user along the first light-incident path; under a condition that the liquid crystal molecules in the third lens are not rotated, the light incident into the eye-protection device directly passes through the third lens and is propagated to the eyes of the user along the second light-incident path.

Optionally, the second light propagator further includes a rotation controller and an electric motor, the electric motor is connected to the rotation controller and is connected to at least one of the first reflector or the second reflector; the rotation controller is configured to control the electric motor to drive at least one of the first reflector or the second reflector to rotate, so as to adjust an angle of reflected light reflected by at least one of the first reflector or the second reflector relative to the light incident into the eye-protection device.

Optionally, the first adjuster is configured to adjust an angle between the direction of the light-transmissive axis of the first polarizer and a horizontal direction to be approximately 45 degrees or approximately 135 degrees.

Optionally, the second adjuster is configured to adjust an angle between the direction of the light-transmissive axis of the second polarizer and a horizontal direction to be approximately 135 degrees or approximately 45 degrees.

Optionally, the third lens is arranged vertically, the second polarizer is arranged horizontally, the first reflector is arranged horizontally and below the second polarizer, the second reflector is arranged at an upper right side of the second polarizer along a light-emergent direction of the eye-protection device and arranged above the third lens.

Optionally, the light emitting device is a high-beam light or a low-beam light of a vehicle.

In a second aspect, a vehicle is provided in the present disclosure, and includes the anti-glaring light system according to the first aspect; and a processor, configured to be connected to the anti-glaring light system and control the anti-glaring light system to operate.

Optionally, the vehicle further includes a meeting-vehicle determination circuit, configured to determine whether a meeting vehicle exists along a driving direction of the vehicle or not, and transmit a result of the determination to the processor; the processor is further configured to perform at least one of (i) providing a first driving signal to the light emitting device, or (ii) providing a second driving signal to the eye-protection device, in a case that the meeting-vehicle determination circuit determines the meeting vehicle exists along the driving direction of the vehicle.

Optionally, the vehicle further includes: an operation acquisition circuit, configured to acquire specified operations inputted by the user and transmit signals related to the specified operations to the processor; wherein, the processor is further configured to perform at least one of (i) providing a first driving signal to the light emitting device, or (ii) providing a second driving signal to the eye-protection device, according to the signals.

Optionally, the vehicle further includes: a sight line captor, configured to capture position information of the eyes of the user, and transmit the position information of the eyes of the user to the processor; wherein the processor is further configured to transmit a light-position adjustment signal to the eye-protection device according to the position information of the eyes of the user transmitted from the sight line captor, so that the eye-protection device adjusts the light propagating along the first light-incident path or the second-incident path to enter the eyes of the user.

Optionally, the meeting-vehicle determination circuit includes at least one of a radar, a laser rangefinder, or a circuit provided with an Internet-of-Vehicle system.

DETAILED DESCRIPTION

To make technical problems to be solved, technical solutions, and advantages of the present disclosure clearer, specific embodiments will be described hereinafter in detail in conjunction with the drawings. Specific details of configurations and components provided hereinafter are only used to enhance understanding of the embodiments of the present disclosure. Thus, it should be understood by one skilled in the art that various modifications and changes may be made to the embodiments described in the present disclosure without departing from the scope and the spirit of the present disclosure. Additionally, for purpose of clarity and brevity, descriptions of known functions and structures are omitted.

It should be understood that specific features, structures or characteristics mentioned throughout the present disclosure are included in some embodiments of the present disclosure. Therefore, "in an embodiment", "in one embodiment", or "in a specific embodiment" appearing throughout the specification of the present application does not necessarily mean an identical embodiment. Additionally, the specific features, structures or characteristics may be combined in some embodiments in any suitable combination.

The anti-glaring light system and the vehicle including the anti-glaring light system provided in the present disclosure may address a problem that light emitted from a headlight of a vehicle may interfere with a sight line of a driver, thereby causing hidden danger to the driver.

Figure 1:
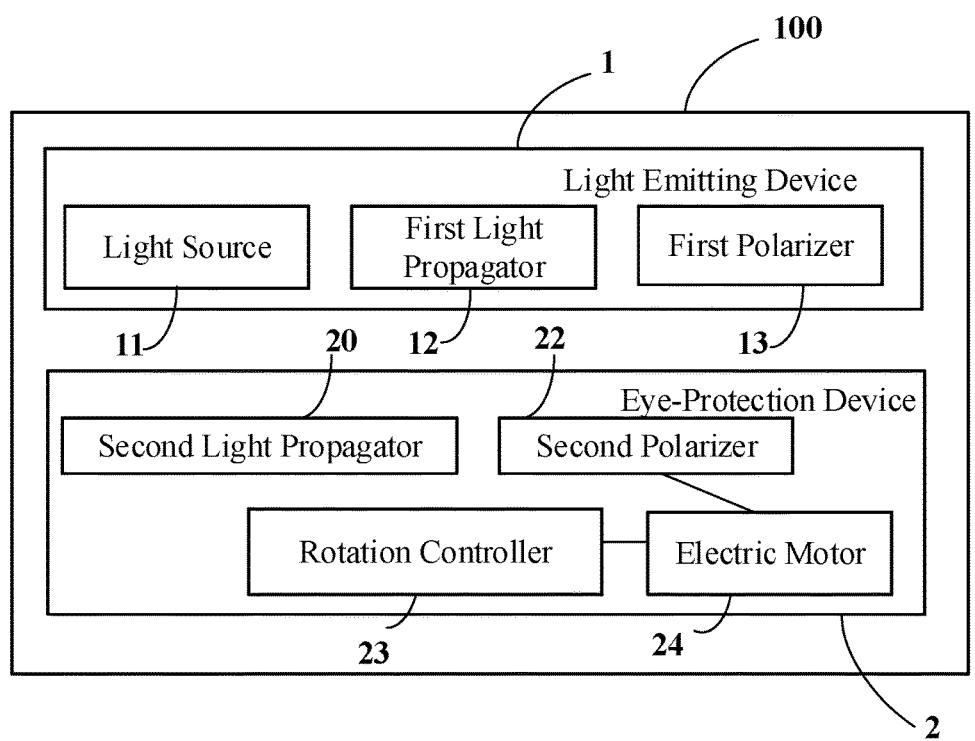
FIG. 1 is a structural schematic diagram of an anti-glaring light system according to some embodiments of the present disclosure.

Some embodiments of the present disclosure provide an anti-glaring light system 100. As shown in FIG. 1, the anti-glaring light system 100 includes a light emitting device 1 and an eye-protection device 2. The light emitting device 1 includes a light source 11, a first light propagator 12 and a first polarizer 13. The light source 11 may emit ordinary light having no polarization state. In actual applications, the light source 11 may a high-beam headlight or a low-beam headlight included in a vehicle.

The first light propagator 12 is configured to cause the ordinary light emitted by the light source 11 to be propagated to the first polarizer 13 and then be emitted outside along a first light-emergent path; or is configured to cause the ordinary light emitted by the light source 11 to be directly emitted outside along a second light-emergent path. The first polarizer 13 is configured to convert the ordinary light emitted by the light source 11 to polarized light having a first polarization direction. The first light-emergent path is different from the second light-emergent path.

The eye-protection device 2 is configured to block polarized light having a second polarization direction in front of human eyes (the light emitted by the light emitting device 1 needs to pass through the eye-protection device 2 before reaching the human eyes), and enable the light emitted by the light-emitter 11 to pass through. In the actual applications, the eye-protection device 2 may be goggles worn by the driver of the vehicle, or may be a component arranged in the vehicle (such as arranged in a front windscreen of the vehicle).

A vehicle including the anti-glaring light system provided in the present disclosure may selectively emit the polarized light or the ordinary light by means of the light emitting device. The eye protection device may shield the driver from being affected by the polarized light having the second polarization direction emitted from an oncoming vehicle, and thereby an anti-glaring effect is achieved. Furthermore, the eye-protection device does not block the ordinary light or the polarized light having the first polarization direction emitted by the vehicle to which the eye-protection device belongs, so that the driver may see a road surface illuminated by the vehicle to which the eye-protection device belongs. In case that the light emitting device selects to emit the ordinary light, a brightness of the ordinary light is not attenuated since the ordinary light does not need to be converted by the polarizer, and thus the light emitting device may provide a better illumination effect so that the driver may observe a road condition more easily.

In view of these, the anti-glaring light system provided in the present disclosure may increase driving security for the driver, and address the problem that light emitted from the headlight of the vehicle may interfere with the sight line of the driver and hidden danger is caused to the driver.

Additionally, the light emitting device 1 and the eye-protection device 2 in the anti-glaring light system of the present disclosure may be applied in a same vehicle, or in different vehicles.

Optionally, the light emitting device 1 is applied in a first meeting vehicle of two vehicles meeting each other, and the eye-protection device 2 is applied in a second meeting vehicle of the two vehicles meeting each other or the driver of the second meeting vehicle, wherein the first meeting vehicle and the second meeting vehicle are different vehicles. In such a case, the first polarization direction in the first vehicle is the same as the second polarization direction in the second vehicle; and the second polarization direction in the first vehicle is the same as the first polarization direction in the second vehicle. That is, the eye-protection device 2 applied in the second meeting vehicle or applied the driver of the second meeting vehicle may block the polarized light emitted from the first meeting vehicle.

Optionally, both the light emitting device 1 and the eye-protection device 2 are applied in the first meeting vehicle or in the second meeting vehicle, or the light emitting device 1 is applied in the first meeting vehicle and the eye-protection device 2 is applied to the driver of the first meeting vehicle, or the light emitting device 1 is applied in the second meeting vehicle and the eye-protection device 2 is applied to the driver of the second meeting vehicle. In such a case, the first polarization direction is different from the second polarization direction. That is, the eye-protection device 2 applied in the first meeting vehicle or applied to the driver of the first meeting vehicle does not block the polarized light emitted by the light emitting device 1 in the first meeting vehicle. Similarly, the eye-protection device 2 applied in the second meeting vehicle or applied to the driver of the second meeting vehicle does not block the polarized light emitted by the light emitting device 1 of the second meeting vehicle.

Each of the first meeting vehicle and the second meeting vehicle may be provided with at least one of the light emitting device 1 or the eye-protection device 2 corresponding to the vehicle.

A specific example of the light emitting device 1 and the eye-protection device 2 of the present disclosure will be described in detail hereinafter.

Figure 2:
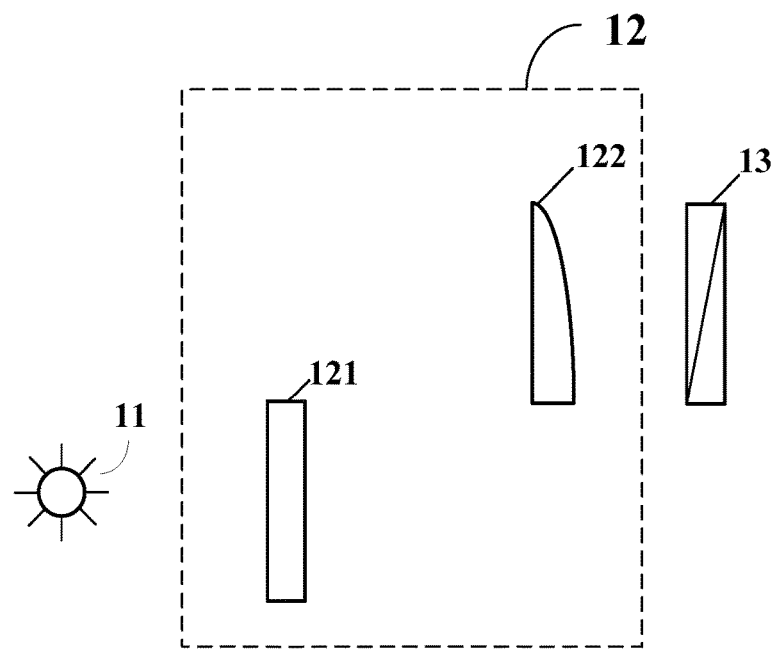
FIG. 2 is a structural schematic diagram of a light emitting device in the anti-glaring light system according to some embodiments of the present disclosure.

As shown in FIG. 1 and FIG. 2 schematically, the light emitting device 1 of the present disclosure includes the light source 11, the first light propagator 12 and the first polarizer 13. The first light propagator 12 includes a first lens 121 and a second lens 122. The first lens 121 is a liquid crystal lens. In case that a first driving signal is provided to the first lens, liquid crystal molecules of the first lens 121 are rotated.

Figure 3:
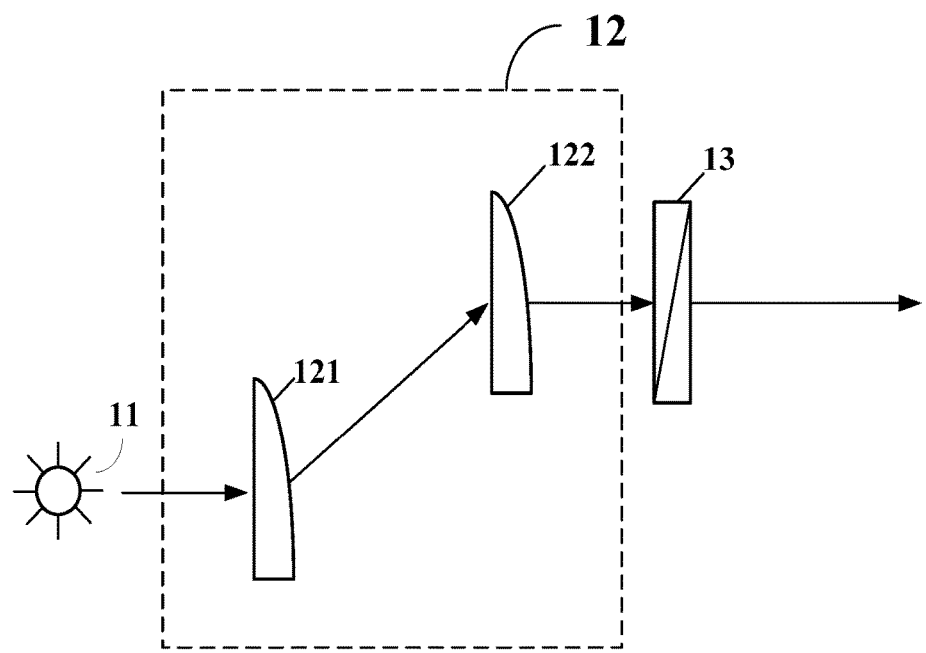
FIG. 3 is a schematic diagram of polarized light emitted by the light emitting device along a first light-emergent path in the anti-glaring light system according to some embodiments of the present disclosure.

As shown in FIG. 3, in case that the liquid crystal molecules of the first lens 121 are rotated when the first driving signal is provided to the first lens, the first lens 121 becomes a lens having a refractive function, referring to a light direction shown by a solid arrow in FIG. 3. After the light emitted by the light source 11 passes through the first lens 121, the light is refracted to the second lens 122 and is refracted by the second lens 122 to the first polarizer 13 so that the light may be emergent along the first light-emergent path. In such a case, the light emergent from the light emitting device 1 is polarized light.

Figure 4:
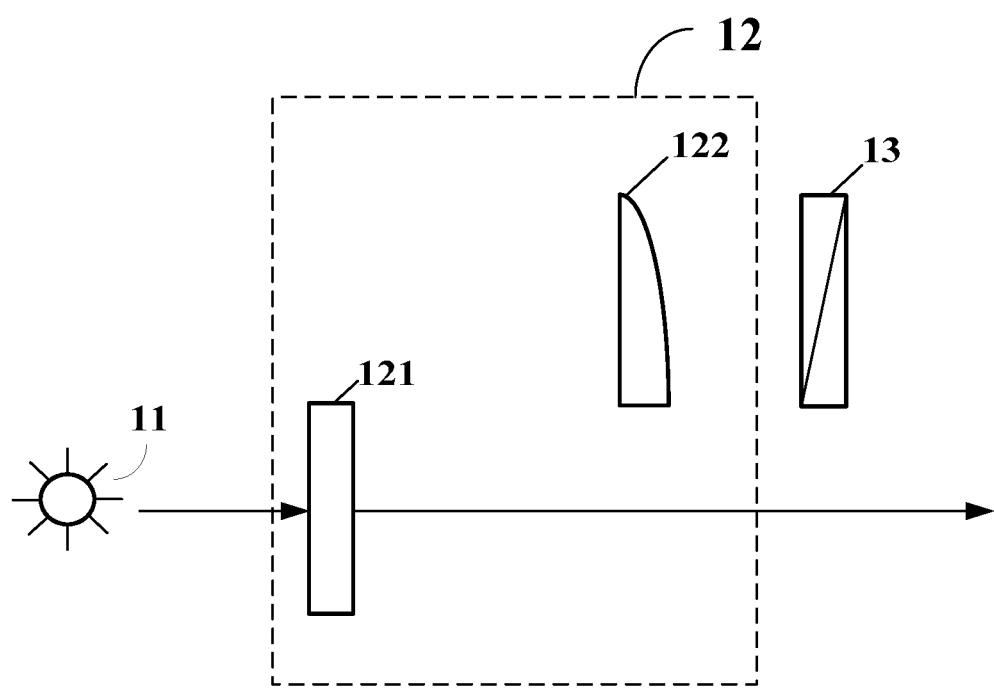
FIG. 4 is a schematic diagram of ordinary light having no polarization direction emitted by the light emitting device along a second light-emergent path in the anti-glaring light system according to some embodiments of the present disclosure.

As shown in FIG. 4, in case that the liquid crystal molecules of the first lens 121 of the present disclosure are not rotated, the first lens 121 becomes a lens having no refractive function, and the light emitted by the light source 11 directly passes through the first lens 121 and is directly emergent along the second light-emergent path. In such a case, the light emergent from the light emitting device 1 are ordinary light having no polarization direction.

Generally, rotations of the liquid crystal molecules in the first lens 121 may be controlled automatically by the vehicle or manually controlled by the driver.

In case that the rotations of the liquid crystal molecules in the first lens 121 are controlled automatically by the vehicle, the vehicle may detect whether a meeting vehicle exists in a driving direction or not through a vehicle-meeting determination circuit in the vehicle. In case that the meeting vehicle exists, a first driving signal may be automatically generated to control the liquid crystal molecules of the first lens 121 to rotate so that the light emitting device 1 emits the polarized light. In case that no meeting vehicle exists, the first driving signal may be stopped or is not generated so as to control the liquid crystal molecules of the first lens to stop rotating or not to rotate, and accordingly, light emitted by the light source 11 is directly emergent through the first lens 121. Thus, the light emitting device 1 emits the ordinary light having no polarization direction. In actual applications, the vehicle-meeting determination circuit may be a front radar, a laser rangefinder or the like arranged in the vehicle; or the vehicle-meeting determination circuit may be a circuit provided with an Internet-of-Vehicle system, the circuit may acquire a condition that vehicles are to meet each other through the Internet-of-Vehicle, and thereby determine whether meeting vehicles exist along the driving direction. Obviously, an operation of the driver may be simplified through automatic controls in the vehicle, so that the driver may pay more attention to road conditions and driving safety may be ensured.

In case that the rotations of the liquid crystal molecules in the first lens 121 are controlled manually by the driver, the driver may manually control the light emitting device 1 to emit polarized light or the ordinary light according to determination from himself. For example, during driving a vehicle, when a meeting vehicle appears along the driving direction, the vehicle may be controlled manually to generate the first driving signal, so that the liquid crystal molecules in the first lens 121 are controlled to rotate and the light emitting device 1 emits the polarized light. When a meeting vehicle does not appear along the driving direction, the vehicle may be controlled manually to stop generating the first driving signal so that the liquid crystal molecules in the first lens 121 are controlled to stop rotating or the rotation of the liquid crystal molecules may be reversed, so that the light emitting device 1 emits the ordinary light having no polarization direction. Obviously, through manual control of the driver, the driver may flexibly control light emitted by the light emitting device 1 according to different illumination requirements of different driving scenes. For example, in case that the light emitting device 1 of the present disclosure is the high-beam light of the vehicle, and the driver of the vehicle desires to signal another driver of the meeting vehicle by switching back and forth between the high-beam light and the low-beam light, the driver of the vehicle may make the vehicle to emit a high beam having no polarization direction manually, thereby ensuring a high light-beam from the high-beam light may be seen by the driver of the meeting vehicle.

The above is exemplary description of the light emitting device 1 of the present disclosure. It may be seen that, the light emitting device 1 of the present disclosure may selectively emit the polarized light having a polarization direction or the ordinary light having no polarization direction according to requirements, and thus may satisfy illumination requirements of a driver for different driving scenes. It should be noted that, one of ordinary skills in the art may make suitable modifications to the light emitting device 1 without departing from the principle of the present disclosure. For example, the first lens 121 of the present disclosure being the liquid crystal lens means that the first lens 121 may implement a function of a liquid crystal lens. In actual applications, a liquid crystal panel may be used as the first lens 121. An implementation of the second lens 122 in the present disclosure is not limited, the second lens 122 may be an ordinary glass lens having only one refractive state, or may be a liquid crystal lens which may change its refractive state according to a control signal.

Figure 5:
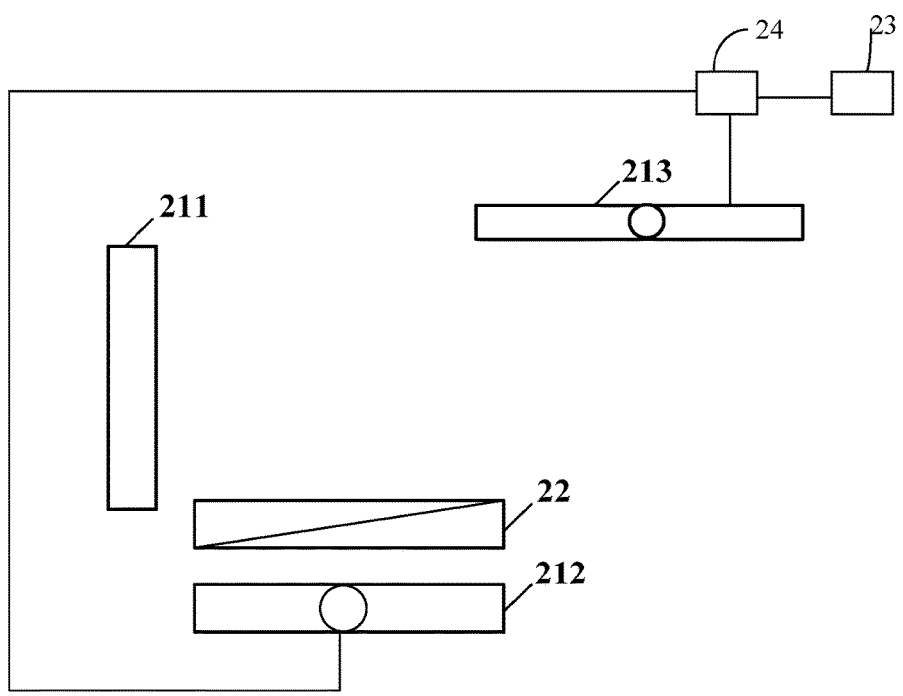
FIG. 5 is a structural schematic diagram of an eye-protection device in the anti-glaring light system according to some embodiments of the present disclosure.

In another aspect, as shown in FIG. 5, the eye-protection device 2 of the present disclosure includes a second light propagator 20 and a second polarizer 22.

The second light propagator 20 is configured to enable light incident into the eye-protection device 2 to be propagated to the second polarizer 22 along a first light-incident path and then propagated to human eyes; or enable the light incident into the eye-protection device 2 to be propagated to the human eyes directly along a second light-incident path. The second polarizer 22 is configured to block a polarizer light having a second polarization direction.

A detailed introduction is provided hereinafter to a case that the incident light of the eye-protection device 2 is controlled to propagate along the first light-incident path or along the second light-incident path by the second light propagator 20.

The second light propagator 20 of the present disclosure specifically includes a third lens 211, a first reflector 212 and a second reflector 213. The third lens 211 is a liquid crystal lens. In case that a second driving signal is provided to the third lens 211, liquid crystal molecules in the third lens 211 are rotated.

Figure 6:
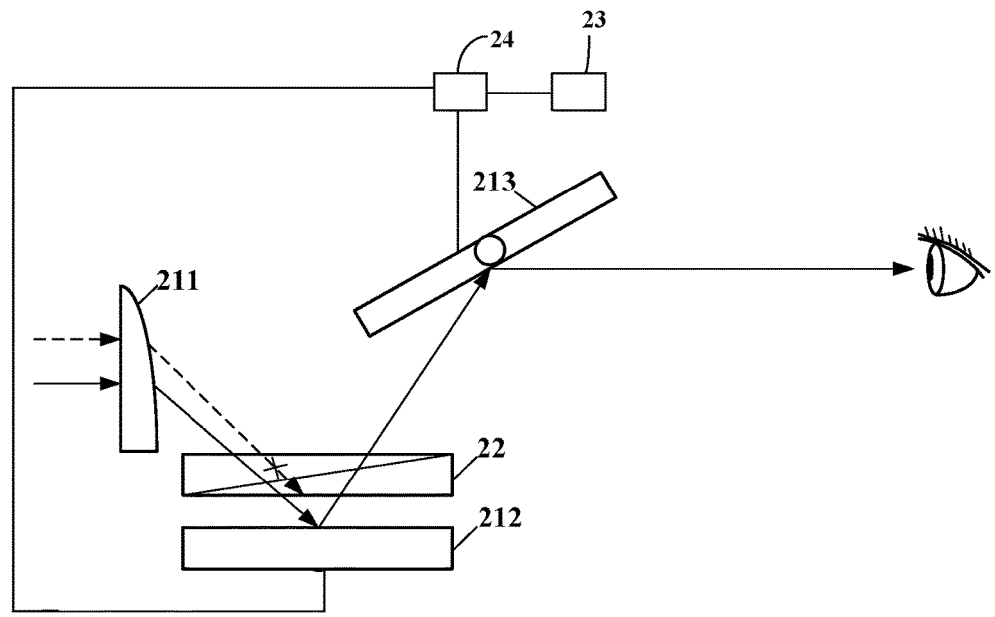
FIG. 6 is a schematic diagram of incident light being incident into human eyes along a first light-incident path in the eye-protection device in the anti-glaring light system according to some embodiments of the present disclosure.

In the case that the incident light propagates along the first light-incident path, as shown in FIG. 6, when the liquid crystal molecules in the third lens 211 are rotated by the second driving signal, the third lens 211 becomes a lens having a refractive function. If the incident light of the eye-protection device 2 has the second polarization direction as shown by the dotted arrow, the incident light is refractive to the second polarizer 22 after passing through the third lens 211 and is blocked by the second polarizer 22. If the incident light of the eye-protection device 2 is not polarized light having the second polarization direction or is the ordinary light having no polarization direction, the incident light is refracted to the second polarizer 22 by the third lens 211 and then passes through the second polarizer 22 and reaches the first reflector 212, and then is reflected to the second reflector 213 by the first reflector 212, and then is reflected to the human eyes by the second reflector 213, as shown by the solid arrow.

Figure 7:
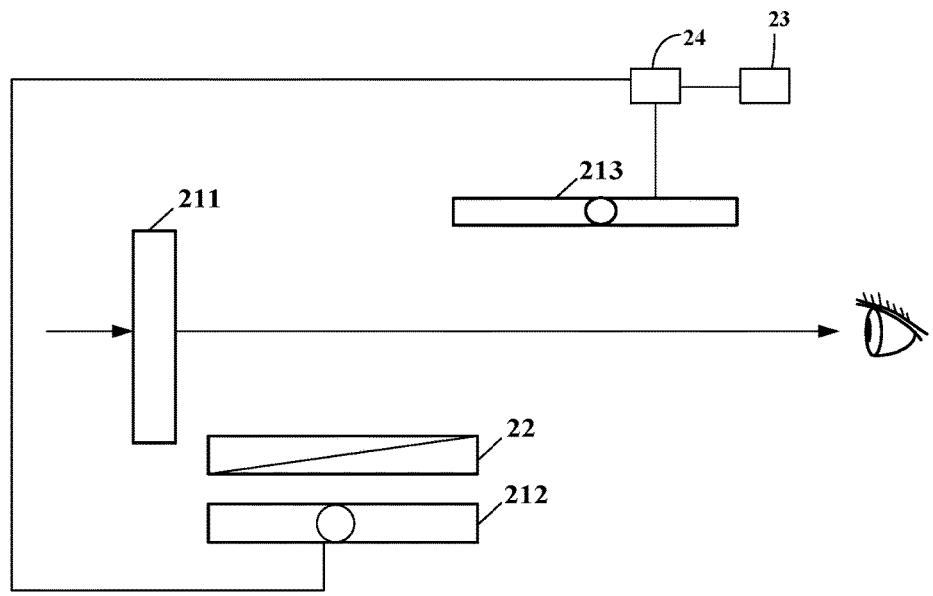
FIG. 7 is a schematic diagram of the incident light being incident into the human eyes along a second light-incident path in the eye-protection device in the anti-glaring light system according to some embodiments of the present disclosure.

In the case that the incident light propagates along the second light-incident path, as shown in FIG. 7, when the liquid crystal molecules in the third lens 211 are rotated by the second driving signal, the third lens 211 becomes a lens having no refractive function. The incident light of the eye-protection device 2, as shown by the solid arrow, passes through the third lens 211 directly and reaches the human eyes.

Generally, rotations of the liquid crystal molecules in the third lens 211 may be controlled automatically by the vehicle or manually controlled by the driver.

In case that the rotations of the liquid crystal molecules in the third lens 211 are controlled automatically by the vehicle, the vehicle may detect whether a meeting vehicle exists along a driving direction or not through the vehicle-meeting determination circuit in the vehicle. In case that the meeting vehicle exists, a second driving signal may be automatically generated by the vehicle to control the liquid crystal molecules in the third lens 211 to rotate so that polarized light having the second polarization direction emitted from the light emitting device 1 in the meeting vehicle may be blocked. In case that no meeting vehicle exists, the second driving signal may be stopped or is not generated so as to control the liquid crystal molecules in the third lens to stop rotating or not to be rotated, and accordingly, all incident light may pass through the third lens 211 and reach the human eyes. Obviously, an operation of the driver may be simplified through automatic controls in the vehicle, so that the driver may pay more attention to road conditions and the driving safety may be ensured.

In case that the rotations of the liquid crystal molecules in the third lens 211 are controlled manually by the driver, the driver may manually control whether the eye-protection device 2 blocks the polarized light having the second polarization direction or not, according to his own determination. For example, during driving a vehicle, when a meeting vehicle appears along the driving direction, the vehicle may be controlled manually to generate the second driving signal so that the liquid crystal molecules in the third lens 211 are controlled to rotate and thus the eye-protection device 2 blocks the polarized light having the second polarization direction emitted from the meeting vehicle. When the meeting vehicle does not appear along the driving direction, the vehicle may be controlled manually to stop generating the second driving signal so that the liquid crystal molecules in the third lens 211 are controlled to stop rotating or the rotation of the liquid crystal molecules in the third lens is reversed, so that the eye-protection device 2 receives all light emitted from the meeting vehicle in front of the vehicle, such as the polarized light or the ordinary light having no polarization direction. Obviously, through manual control of the driver, the driver may flexibly control light received by the eye-protection device 2 according to different illumination requirements of different driving scenes. For example, in case that the driver desires to see any light emitted from other vehicles, the driver may manually control liquid crystal molecules in the third lens 211 of the eye-protection device 2 to stop rotating or the rotation of the liquid crystal molecules to be reversed.

Additionally, in actual applications, the eye-protection device 2 of the present disclosure may further include a rotation controller 23 and an electric motor 24. The rotation controller 23 is configured to control at least one of the first reflector 212 or the second reflector 213 to rotate, so that a reflection angle of at least one of the first reflector 212 or the second reflector 213 relative to the incident light of the eye-protection device 2 may be adjusted. The electric motor 24 may control, under a control of the rotation controller 23, a rotation angle of at least one of the first reflector 212 or the second reflector 213 relative to the third lens 211. The electric motor 24 may be any electric motor applicable in the eye-protection device 2 and implement a rotation function, such as a stepping motor.

Considering an example that the electric motor 24 adjusts the second reflector 213 and the second polarizer 22 of the present disclosure is a polaroid or a polarization film. Referring to FIG. 5, the third lens 211 may be vertically arranged, the second polarizer 22 may be horizontally arranged and below the third lens 211. The first reflector 212 is parallel to the second polarizer 22 and below the second polarizer 22. The second reflector 213 is at an upper right side of the second polarizer 22 and above the third lens 211, and the second reflector 213 is initially arranged horizontally and may be rotated under a control of the electric motor 24.

Based on the above, the vehicle may also be provided with a sight-line captor configured to capture position information of the human eyes of the driver. The sight-line captor 85 of the present disclosure may transmit the position information of the human eyes captured by the sight-line captor 85 to the rotation controller 23, so that the rotation controller 23 may control, according to the position information of the human eyes captured by the sight-line captor 85, the electric motor 24 to adjust a rotation angle of at least one of the first reflector 212 or the second reflector 213 relative to the third lens 211, so that the light passing through the eye-protection device 2 may reach the human eyes accurately. In actual applications, the sight-line capture 85 may be a camera arranged in the vehicle or the eye-protection device.

Additionally, in actual applications, the first polarizer 13 in the light emitting device 1 of the present disclosure may also be a polaroid or a polarization film. If the light emitting device 1 is applied in the first meeting vehicle, and the eye-protection device 2 is applied in the second meeting vehicle or applied to the driver of the second meeting vehicle, a light-transmissive axis of the first polarizer 13 is perpendicular to a light-transmissive axis of the second polarizer 22, i.e., a polarization direction of polarized light emitted from the first polarizer in one of the first meeting vehicle and the second meeting vehicle is perpendicular to a polarization direction of the second polarizer in the other of the first meeting vehicle and the second meeting vehicle, thereby achieving an effect of block the light emitted from the one of the first meeting vehicle and the second meeting vehicle.

When both the light emitting device 1 and the eye-protection device 2 are applied in the first meeting vehicle or in the second meeting vehicle, for example, the light emitting device 1 is applied in the first meeting vehicle and the eye-protection device 2 is applied to the driver of the first meeting vehicle, or the light emitting device 1 is applied in the second meeting vehicle and the eye-protection device 2 is applied to the driver of the second meeting vehicle, the light-transmissive axis of the first polarizer 13 is parallel to the light-transmissive axis of the second polarizer 22, i.e. the eye-protection device of a vehicle does not block the polarized light emitted from the same vehicle, so as to ensure the driver of the vehicle may see a road surface illuminated by the vehicle normally.

It may be known that, in case that both the first polarizer 13 and the second polarizer 22 are polaroids or polarization films, a first polarization direction is a direction of the light-transmissive axis of the first polarizer 13, a second polarization direction is a direction of the light-transmissive axis of the second polarizer 22. Optionally, an angle between the first polarization direction of the present disclosure and a horizontal direction is in a range of 20 degrees to 70 degrees, such as approximately 45 degrees, or is in a range of 110 degrees to 170 degrees, such as approximately 135 degrees. An angle between the second polarization direction of the present disclosure and the horizontal direction is in a range of 20 degrees to 70 degrees, such as approximately 45 degrees, or is in a range of 110 degrees to 170 degrees, such as approximately 135 degrees.

For example, in a case that both the light emitting device 1 and the eye-protection device 2 are applied in the same vehicle, both the angle between the first polarization direction of the light emitting device 1 and the horizontal direction and the angle between the second polarization direction of the eye-protection device 2 and the horizontal direction may be approximately 45 degrees or may be approximately 135 degrees. In a case that the light emitting device 1 and the eye-protection device 2 are applied in different vehicles, the angle between the first polarization direction of the light emitting device 1 and the horizontal direction may be approximately 45 degrees, and the angle between the second polarization direction of the eye-protection device 2 and the horizontal direction may be approximately 135 degrees; or the angle between the first polarization direction of the light emitting device 1 and the horizontal direction may be approximately 135 degrees, and the angle between the second polarization direction of the eye-protection device 2 and the horizontal direction may be approximately 45 degrees.

In order to avoid the light emitting devices 1 in two meeting vehicles from emitting polarized light having a same polarization direction and cause each of the meeting vehicles may not achieve an anti-glaring effect, when the anti-glaring light system of the present disclosure is applied in a same vehicle, the anti-glaring system may further include a first adjuster 3 configured to adjust the direction of the light-transmissive axis of the first polarizer 13 in the light emitting device 1, and a second adjuster 4 configured to the direction of the light-transmissive axis of the second polarizer 22 in the eye-protection device 2. Specifically, in the case that the angle between the first polarization direction or the second polarization direction and the horizontal direction is approximately 45 degrees or approximately 135 degrees, the first adjuster 3 may adjust the angle between the first polarization direction (i.e., the direction of the light-transmissive axis of the first polarizer 13) and the horizontal direction to toggle between approximately 135 degrees and approximately 45 degrees, and the second adjuster 4 may adjust the angle between the second polarization direction (i.e., the direction of the light-transmissive axis of the second polarizer 22) and the horizontal direction to toggle between approximately 135 degrees and approximately 45 degrees.

When two vehicles meet, if the light emitting device 1 of the two vehicles happen to emit polarized light having a same polarization direction (i.e. the angle between the first polarization direction and the horizontal direction in each of the vehicle is approximately 135 degrees or approximately 45 degrees), the driver of one of the vehicles may change at least one of the angle between the first polarization direction and the horizontal direction or the angle between the second polarization direction and the horizontal direction by using the first adjuster 3 and the second adjuster 4, so as to prevent the anti-glaring effect from not being achieved.

The above is description of the anti-glaring light system of the present disclosure. It may be seen that the anti-glaring light system of the present disclosure may block light emitted from the meeting vehicle existing in an opposite direction, without affecting the driver of a vehicle from observing illumination of the vehicle. Thus, the anti-glaring light system of the present disclosure may effectively increase the driving safety for the driver.

Figure 8:
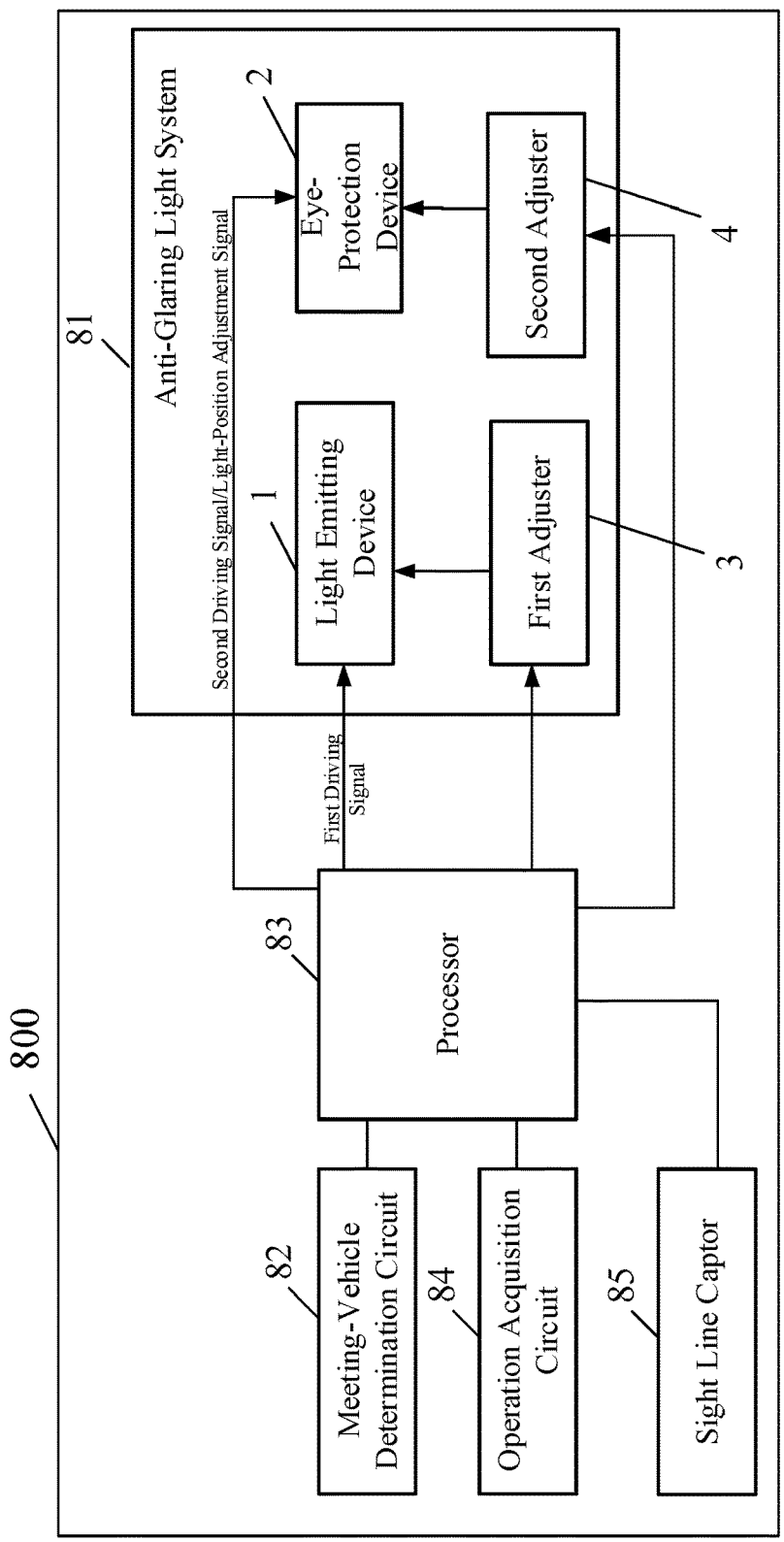
FIG. 8 is a structural schematic diagram of a vehicle according to some embodiments of the present disclosure.

As shown in FIG. 8, some embodiments of the present disclosure provide a vehicle 800. The vehicle 800 includes the anti-glaring light system 81 provided in the present disclosure, a meeting-vehicle determination circuit 82, a processor 83, an operation acquisition circuit 84 and a sight-line captor 85. The anti-glaring light system 81, the meeting-vehicle determination circuit 82, the operation acquisition circuit 84 and the sight-line captor 85 are connected to the processor 83. The vehicle 800 of the present disclosure based on the anti-glaring light system 81 shields, for the driver of the vehicle 800, light from the meeting vehicle existing in the opposite direction, so that the sight line of the driver is not interfered. Meanwhile, the driver may also see normally the light emitted from the vehicle itself, and thereby see road conditions in time.

Specifically, the vehicle 800 of the present disclosure may detect the meeting vehicle along the driving direction and automatically control the light-emitting device 1 and the eye-protection device 2. The meeting-vehicle determination circuit 82 is configured to determine whether the meeting vehicle exists along the driving direction of the vehicle 800 or not, and transmit a result of the determination to the processor 83.

In actual applications, the meeting-vehicle determination circuit 82 of the present disclosure may be a forward-looking radar of the vehicle 800. The forward-looking radar may detect whether the meeting vehicle exists along the driving direction or not, or the meeting-vehicle determination circuit 82 may also an Internet-of-Vehicle system which may acquire the meeting vehicle is to appear or has appeared along the driving direction.

The processor 83 is configured to transmit the first driving signal to the first lens 121 in the light emitting device 1, when the light emitting device 1 in the anti-glaring light system 81 includes the first lens 121 and the meeting-vehicle determination circuit 82 detects that the meeting vehicle exists along the driving direction of the vehicle 900; and the processor 83 is configured to transmit the second driving signal to the third lens 211 in the eye-protection device 2, when the eye-protection device 2 in the anti-glaring light system 81 includes the third lens 211 and the meeting-vehicle determination circuit 82 detects that the meeting vehicle exists along the driving direction of the vehicle 800.

Additionally, the driver of the vehicle 800 may also control the light emitting device 1 and the eye-protection device 2 manually. As shown in FIG. 8, the vehicle 800 may also include the operation acquisition circuit 84. The operation acquisition circuit 84 is configured to acquire specified operations performed by a user (such as the driver), and transmit signals related to the specified operations to the processor 83. The processor 83 is further configured to transmit the first driving signal to the first lens 121 in the light emitting device 1, when the light emitting device 1 in the anti-glaring light system 81 includes the first lens 121 and the operation acquisition circuit 84 acquires the specified operations; and the processor 83 is configured to transmit the second driving signal to the third lens 211 in the eye-protection device 2, when the eye-protection device 2 in the anti-glaring light system 81 includes the third lens 211 and the operation acquisition circuit 82 acquires the specified operations.

In actual applications, the operation acquisition circuit 84 in the present disclosure may be a switch component (such as a button). The user may control the processor 83 to generate or not generate at least one of the first driving signal or the second driving signal, by controlling the switch component to be turned on or turned off.

The sight-line captor 85 is configured to capture the position information of the eyes of the driver, and transmit the captured position information of the eyes to the processor 83. The processor 83 is further configured to, according to the position information of the eyes of the driver captured by the sight line captor 85, transmit a light-position adjustment signal to the rotation controller 23 in the eye-protection device 2, so that the rotation controller 23 may control the electric motor 24 to adjust the rotation angle of at least one of the first reflector 212 or the second reflector 213 relative to the third lens 211, and accordingly, the light passing through the eye-protection device 2 may reach the eyes accurately.

According to the above, the vehicle provided in the present disclosure may selectively transmit the polarized light or the ordinary light through the light emitting device. In a case that the polarized light is emitted outside, the eye-protection device in the vehicle may block, for the driver of the vehicle, polarized light emitted from the meeting vehicle existing in the opposite direction, thereby achieving the anti-glaring effect; and the eye-protection device in the vehicle may not block the polarized light emitted from the vehicle so that the driver of the vehicle may see road surfaces illuminated by the vehicle clearly. In a case that the ordinary light is emitted outside, a brightness of the ordinary light is not attenuated since the ordinary light is not transformed by the first polarizer, and thus a better illumination effect may be achieved, and the driver may see a condition of a road more easily.

The above are optional embodiments of the present disclosure. It should be noted that numerous modifications and embellishments may be made by one of ordinary skills in the art without departing from the spirit of the present disclosure, and such modifications and embellishments also fall within the scope of the present disclosure.

What is claimed is:
1. An anti-glaring light system, comprising:
   a light emitting device, configured to selectively emit first polarized light along a first light-emergent path or emit ordinary light along a second light-emergent path, wherein the first polarized light has a first polarization direction; and an eye-protection device, configured to block second polarized light having a second polarization direction incident into the eye-protection device, configured to enable the first polarized light to pass through the eye-protection device along a first light-incident path, and configured to enable the ordinary light to be propagated to the eyes of the user along a second light-incident path.

2. The anti-glaring light system according to claim 1, wherein, the light emitting device comprises a light source, a first light propagator, and a first polarizer;

the light source is configured to emit the ordinary light;
the first light propagator is configured to enable the ordinary light emitted by the light source to be propagated to the first polarizer and be emitted out along the first light-emergent path, or enable the ordinary light to be emitted out directly along the second light-emergent path; and
the first polarizer is configured to convert the ordinary light to the first polarized light having the first polarization direction.

3. The anti-glaring light system according to claim 2, further comprising:

a first adjuster, configured to adjust a direction of a light-transmissive axis of the first polarizer.

4. The anti-glaring light system according to claim 3, wherein the first adjuster is configured to adjust an angle between the direction of the light-transmissive axis of the first polarizer and a horizontal direction to be approximately 45 degrees or approximately 135 degrees.

5. The anti-glaring light system according to claim 2, wherein the first light propagator comprises a first lens and a second lens, the first lens is adjacent to the light source, and the second lens is adjacent to the first polarizer;

the first lens is a liquid crystal lens comprising liquid crystal molecules, and is configured to enable the liquid crystal molecules in the first lens to rotate under a condition that the first lens is applied with a first driving signal, so that the ordinary light is refracted to the second lens by the first lens and is propagated to the first polarizer through the second lens and is emitted out along the first light-emergent path;
wherein under a condition that the liquid crystal molecules in the first lens are not rotated, the ordinary light emitted by the light source is emitted out directly along the second light-emergent path after the ordinary light passes through the first lens.

6. The anti-glaring light system according to claim 1, wherein, the eye-protection device comprises a second light propagator and a second polarizer;

the second light propagator is configured to enable the first polarized light having the first polarization direction to be propagated to the second polarizer and be propagated to the eyes of the user along the first light-incident path, and enable the ordinary light to be propagated to the eyes of the user directly along the second light-incident path;
a polarization direction of the second polarizer is same as the first polarization direction of the first polarized light.

7. The anti-glaring light system according to claim 6, further comprising:

a second adjuster, configured to adjust a direction of a light-transmissive axis of the second polarizer.

8. The anti-glaring light system according to claim 7, wherein the second adjuster is configured to adjust an angle between the direction of the light-transmissive axis of the second polarizer and a horizontal direction to be approximately 135 degrees or approximately 45 degrees.

9. The anti-glaring light system according to claim 6, wherein the second light propagator comprises a third lens, a first reflector, and a second reflector, the third lens is at a light-incident side of the second polarizer relative to the second polarizer, the first reflector is at a light-emergent side of the second polarizer relative to the second polarizer, and the second reflector is at a light-emergent side of the first reflector relative to the first reflector;

the third lens is a liquid crystal lens comprising liquid crystal molecules, and is configured to enable the liquid crystal molecules in the third lens to rotate under a condition that the third lens is applied with a second driving signal, so that light incident into the eye-protection device is propagated to the second polarizer through the third lens, and polarized light passing through the second polarizer is propagated to the first reflector, reflected to the second reflector by the first reflector, reflected by the second reflector and propagated to the eyes of the user along the first light-incident path;
under a condition that the liquid crystal molecules in the third lens are not rotated, the light incident into the eye-protection device directly passes through the third lens and is propagated to the eyes of the user along the second light-incident path.

10. The anti-glaring light system according to claim 9, wherein the second light propagator further comprises a rotation controller and an electric motor, the electric motor is connected to the rotation controller and is connected to at least one of the first reflector or the second reflector;

the rotation controller is configured to control the electric motor to drive at least one of the first reflector or the second reflector to rotate, so as to adjust an angle of reflected light reflected by at least one of the first reflector or the second reflector relative to the light incident into the eye-protection device.

11. The anti-glaring light system according to claim 9, wherein the third lens is arranged vertically, the second polarizer is arranged horizontally, the first reflector is arranged horizontally and below the second polarizer, the second reflector is arranged at an upper right side of the second polarizer along a light-emergent direction of the eye-protection device and arranged above the third lens.

12. The anti-glaring light system according to claim 1, wherein the light emitting device is in a first vehicle, the eye-protection device is in a second vehicle meeting the first vehicle, or the eye-protection device is a pair of eye-protection glasses worn by a driver of the second vehicle.

13. The anti-glaring light system according to claim 12, wherein the first vehicle and the second vehicle are different, and the first polarized light having the first polarization direction emitted from the light emitting device in the first vehicle is blocked by the eye-protection device in the second vehicle.

14. The anti-glaring light system according to claim 12, wherein the first vehicle and the second vehicle are same, and the first polarization direction is perpendicular to the second polarization direction.

15. The anti-glaring light system according to claim 1, wherein the light emitting device is a high-beam light or a low-beam light of a vehicle.

16. A vehicle, comprising:
the anti-glaring light system according to claim 1; and
a processor, configured to be connected to the anti-glaring light system and control the anti-glaring light system to operate.

17. The vehicle according to claim 16, further comprising:
a meeting-vehicle determination circuit, configured to determine whether a meeting vehicle exists along a driving direction of the vehicle or not, and transmit a result of the determination to the processor;
the processor is further configured to perform at least one of (i) providing a first driving signal to the light emitting device, or (ii) providing a second driving signal to the eye-protection device, in a case that the meeting-vehicle determination circuit determines the meeting vehicle exists along the driving direction of the vehicle.

18. The vehicle according to claim 16, further comprising:
an operation acquisition circuit, configured to acquire specified operations inputted by the user and transmit signals related to the specified operations to the processor;
wherein, the processor is further configured to perform at least one of (i) providing a first driving signal to the light emitting device, or (ii) providing a second driving signal to the eye-protection device, according to the signals.

19. The vehicle according to claim 16, further comprising:
a sight line captor, configured to capture position information of the eyes of the user, and transmit the position information of the eyes of the user to the processor;
wherein the processor is further configured to transmit a light-position adjustment signal to the eye-protection device according to the position information of the eyes of the user transmitted from the sight line captor, so that the eye-protection device adjusts the light propagating along the first light-incident path or the second-incident path to enter the eyes of the user.

20. The vehicle according to claim 16, wherein, the meeting-vehicle determination circuit comprises at least one of a radar, a laser rangefinder, or a circuit provided with an Internet-of-Vehicle system.

* * * * *